United States Patent [19]
Pellock

[11] Patent Number: 5,857,306
[45] Date of Patent: Jan. 12, 1999

[54] TRUSS-TO-TRUSS ASSEMBLIES AND CONNECTORS THEREFOR

[75] Inventor: Michael A. Pellock, Edwardsville, Ill.

[73] Assignee: MiTek Holdings, Inc., Wilmington, Del.

[21] Appl. No.: 832,379

[22] Filed: Apr. 2, 1997

[51] Int. Cl.⁶ .................................................. E04C 3/11
[52] U.S. Cl. .............................. 52/643; 52/639; 52/712; 52/715; 52/656.9; 403/230; 403/231; 403/403
[58] Field of Search ............................. 52/639, 641, 643, 52/712, 714, 715, 650.2, 656.9, 637, 638; 403/230, 231, 232.1, 403

[56] References Cited

U.S. PATENT DOCUMENTS

| | | | |
|---|---|---|---|
| 1,174,097 | 3/1916 | Spear et al. ............................ | 52/714 X |
| 3,229,333 | 1/1966 | Hillesheim et al. ................... | 403/231 |
| 3,425,720 | 2/1969 | Spane ................................... | 403/230 X |
| 3,945,741 | 3/1976 | Wendt .................................. | 403/232 |
| 4,335,555 | 6/1982 | Southerland .......................... | 52/639 |
| 4,513,554 | 4/1985 | Johnson et al. ...................... | 403/231 X |
| 4,688,358 | 8/1987 | Madray ................................ | 52/655.1 X |
| 4,817,359 | 4/1989 | Colonias ............................... | 52/643 |
| 5,042,217 | 8/1991 | Bugbee et al. ....................... | 52/643 |
| 5,186,571 | 2/1993 | Hentzschel ........................... | 403/231 |
| 5,253,465 | 10/1993 | Gilb ..................................... | 52/643 |
| 5,457,927 | 10/1995 | Pellock et al. . | |
| 5,657,596 | 8/1997 | Powers, III .......................... | 52/641 X |
| 5,664,392 | 9/1997 | Mucha ................................. | 52/656.9 X |

FOREIGN PATENT DOCUMENTS

| | | | |
|---|---|---|---|
| 185694 | 9/1922 | United Kingdom ................ | 403/232.1 |
| 2112492 | 7/1983 | United Kingdom ................ | 403/403 |

*Primary Examiner*—Carl D. Friedman
*Assistant Examiner*—Laura A. Callo
*Attorney, Agent, or Firm*—Senniger, Powers, Leavitt & Roedel

[57] ABSTRACT

An assembly of trusses fabricated of sheet metal wherein the lower chord of a supported truss is connected to the lower chord of a supporting truss by a connector formed of sheet metal with the supported truss at an angle to the supporting truss, and connectors for making the connection.

15 Claims, 6 Drawing Sheets

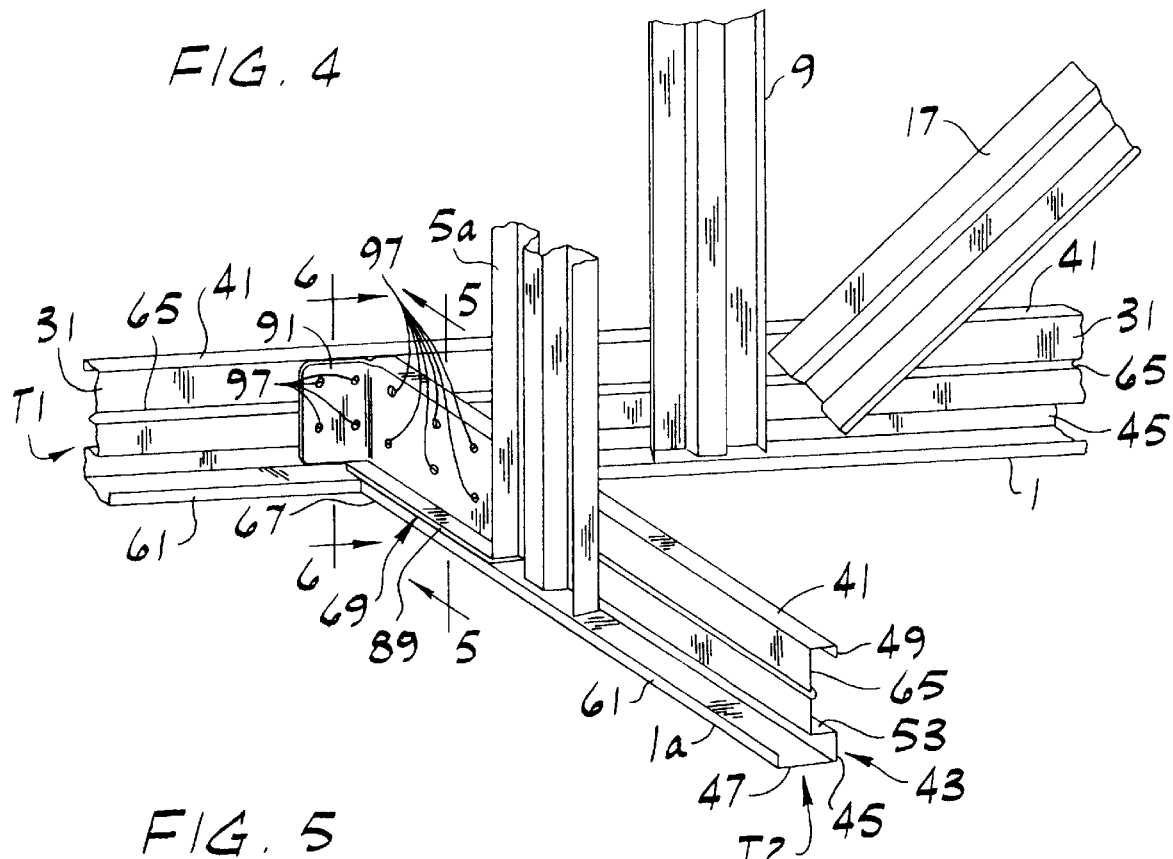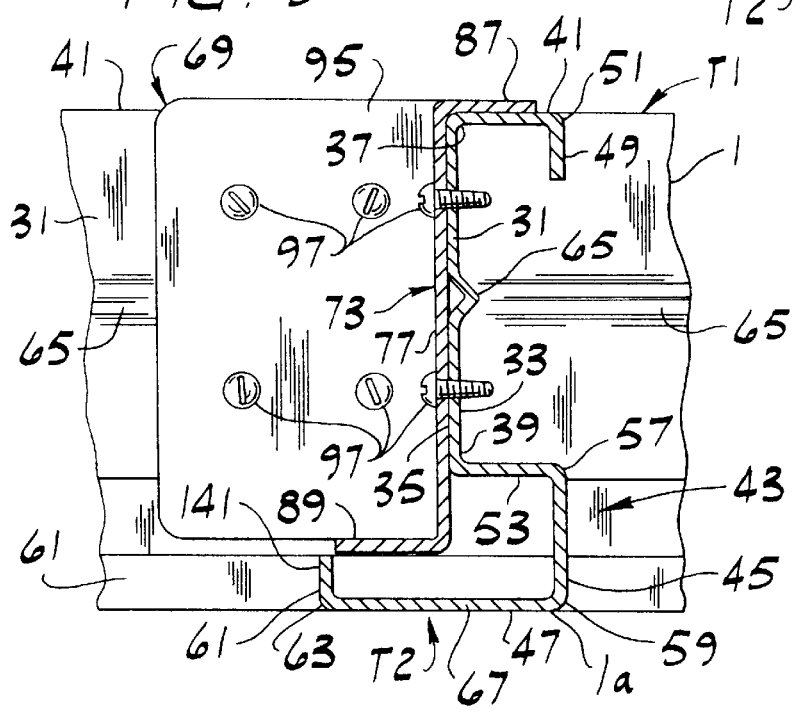

TRUSS-TO-TRUSS ASSEMBLIES AND CONNECTORS THEREFOR

BRIEF SUMMARY OF THE INVENTION

This invention relates to truss-to-truss assemblies for building construction and connectors therefor, and more particularly to assemblies of trusses which are fabricated of cold rolled sheet metal structural members, and to connectors therefor.

The invention is particularly directed to truss-to-truss assemblies wherein the lower chord of a truss fabricated of cold rolled sheet metal structural members of the type shown in U.S. Pat. No. 5,457,927, issued Oct. 17, 1995 and coassigned by the inventor hereof, is connected to the lower chord of another truss of similar type with the lower chords generally coplanar in a generally horizontal plane and the two trusses in two different generally vertical planes at an angle one to the other, and further directed to connectors per se for effecting the connection of the trusses. The first-mentioned truss may be referred to as the carried or supported truss and the second-mentioned truss may be referred to as the carrying or supporting truss, and the connectors may also be referred to as hangers. It is to be understood, however, that the invention is not limited to assemblies of trusses with lower chords so fabricated, nor to truss-to-truss assemblies wherein the lower chord of the supported truss is connected to the lower chord of the supporting truss. It is to be further understood that the connectors of the invention are not limited to use for connection of trusses with lower chords so fabricated nor to use for connection of the lower chord of the supported truss to the lower chord of the supporting truss. For example, the invention may be applicable to assemblies wherein each truss has a horizontal upper chord and the upper chords of trusses are connected together, and the connectors of the invention may be useful for effecting such connections.

Among the several objects of the invention may be noted the provision of a truss-to-truss assembly such as above described with a strong rigid joint interconnecting the trusses; the provision of an assembly of trusses fabricated of cold rolled sheet metal structural members of the type shown in the aforesaid U.S. Pat. No. 5,457,927, with a strong rigid joint interconnecting the lower chords of the trusses; the provision of such an assembly in which the trusses are in generally vertical planes generally at right angles to one another; the provision of such an assembly in which the trusses are in generally vertical planes with the supported truss extending obliquely (diagonally) (e.g., at a 45° angle) with respect to the supporting truss; the provision of special connectors for interconnecting one end of the lower chord of the supported truss to one side of the lower chord of the supporting truss; the provision of such a connector for the right-angled connection of the supported truss; the provision of such a connector for the oblique (diagonal) connection of the supported truss; and the provision of such connectors which may be economically manufactured of sheet metal and which may be readily and economically installed, using self-tapping screws.

In general, a truss-to-truss assembly of this invention comprises a supporting truss and a supported truss each having an elongate member formed of sheet metal. The sheet metal member of the supported truss is connected at one end thereof to the sheet metal member of the supporting truss by means comprising a connector formed from a sheet metal blank shaped and bent to have a first part generally in the form of a rectangular plate having first and second opposite faces, said plate constituting a first plate of said connector and having first and second longitudinal edges, a first end edge and a second end edge, said first connector plate having a first flange bent to extend laterally outward from said first face thereof at said first longitudinal edge thereof and a second flange bent to extend laterally outward from said second face thereof in the opposite direction to said first flange of said first connector plate at said second longitudinal edge thereof, the first end edge of said first plate connector being a free edge, and said connector further having a second part in the form of a plate and constituting a second connector plate bent from the blank at said second end edge of said first connector plate and extending at an angle with respect to said first connector plate, said second connector plate having first and second faces in continuation of the said first and second faces of said first connector plate, respectively. The connector has one of the connector plates engaged with the sheet metal member of the supported truss at said one end thereof, and the other of said connector plates projecting out from said one end of the supported truss and engaged with said sheet metal member of the supporting truss, means being provided fastening the connector plates to said sheet metal members.

In general, a connector of this invention for use in connecting the trusses together is formed of sheet metal and comprises a first generally rectangular plate having first and second longitudinal edges, a first end edge and a second end edge, said first connector plate having a first and second flange bent to extend laterally outward therefrom at said first and second longitudinal edges thereof, respectively, and a second plate integral with the first plate bent to extend at an angle with respect to the first plate at said second end edge of the first plate.

Other objects and features will be in part apparent and in part pointed out hereinafter.

BRIEF DESCRIPTION OF THE DRAWINGS

FIG. 4 is a view in perspective showing the lower-chord-to-lower-chord joint of the truss-to-truss assembly of FIGS. 1–3;

FIG. 5 is a vertical section on line 5—5 of FIG. 4, on a larger scale than FIG. 4;

Corresponding reference characters indicate corresponding parts throughout the several views of the drawings.

DETAILED DESCRIPTION

Figure 1:
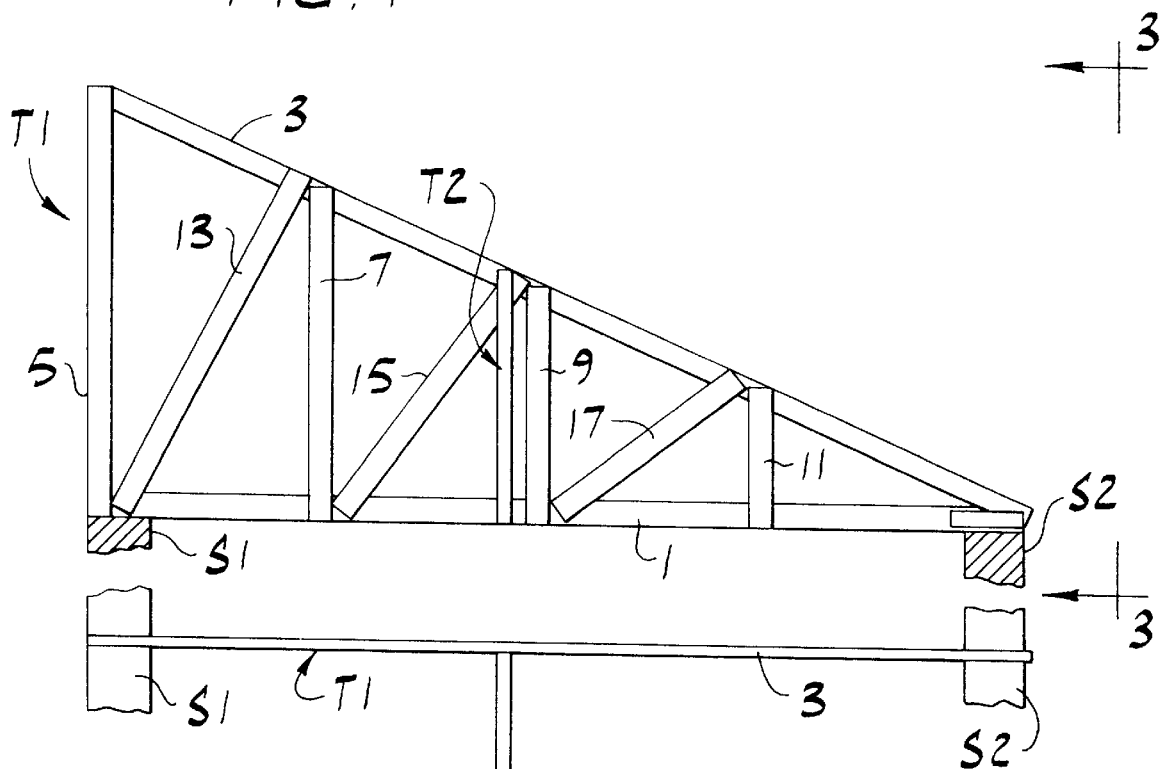
FIG. 1 is a diagrammatic view showing a supporting truss in side elevation and a supported truss in end elevation, the supported truss being in a vertical plane at a right angle to the plane of the supporting truss.
Figure 2:
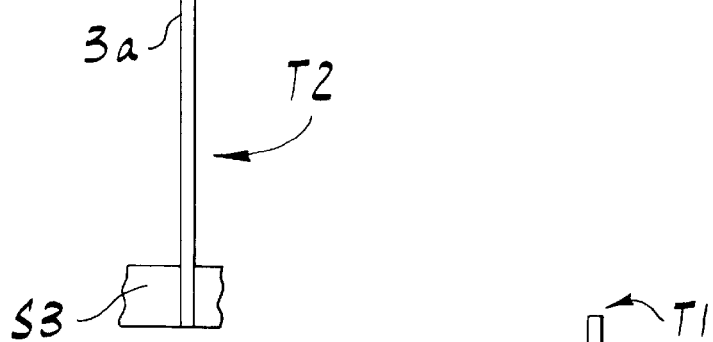
FIG. 2 is a diagrammatic view in plan of the truss-to-truss assembly shown in FIG. 1.
Figure 3:
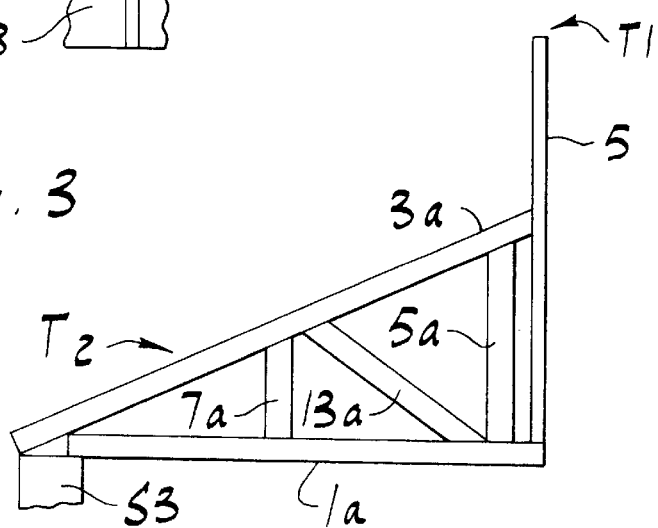
FIG. 3 is a diagrammatic view on line 3—3 of FIG. 1 showing the supported truss in side elevation and the supporting truss in end elevation.

Referring first to FIGS. 1–3 of the drawings, a truss-to-truss assembly of this invention is shown as comprising a first truss indicated in its entirety at T1, referred to as the supporting truss, and a second truss indicated in its entirety at T2, referred to as the supported truss. For purposes of illustrating the invention, the first truss T1 is shown as being in the form of a right triangle, comprising an elongate lower chord 1 forming one leg of the right triangle, the lower chord generally being horizontal in the building construction in which the trusses are used, an inclined upper chord 3 forming the hypotenuse of the right triangle, vertical web members extending between the chords including a web member 5 which may be referred to as the high end or peak end web member forming the other leg or altitude of the right triangle, intermediate vertical web members 7, 9 and 11, and inclined web members 13, 15 and 17 for triangulation of the truss. This type of truss may be referred to as a mono-pitch truss, and it will be understood that it is only exemplary of different trusses that may be used. The second truss T2 is similar to but smaller than the first truss T1, comprising an elongate lower chord 1a, an inclined upper chord 3a, vertical web members 5a and 7a, and inclined member 13a.

In accordance with this invention, the lower chord 1, 1a of each truss comprises an elongate chord member formed as disclosed in the aforesaid prior U.S. Pat. No. 5,457,927 of sheet metal with such a shape in cross-section as to have a web 31 having first and second faces 33 and 35 and first and second longitudinal edges 37 and 39, a first relatively narrow flange 41 extending laterally outwardly from the first face 33 of the web at the first (the edge 37) of said longitudinal edges, and further to have a formation (which may be referred to as the head formation) indicated in its entirety by the reference 43 integrally joined to the web at the second (the edge 39) of the longitudinal edges of the web. More particularly, this formation has a portion 45 offset laterally outwardly from said first face 33 of the web 31 and a generally flat reentrant portion 47 extending back over the second edge 39 of the web and spaced outwardly from said second edge constituting what may be referred to as a head for the elongate sheet metal member. The flange 41 is generally flat, extends out from the first face 33 of the web 31 generally at right angles to the web, and has a relatively narrow, generally flat reentrant lip 49 at its outer edge 51 generally at right angles thereto. The aforesaid formation 43 specifically comprises a flange 53 constituting a second flange on the web 31 extending laterally outwardly from the first face 33 of the web at the second longitudinal edge 39 of the web, a relatively narrow generally flat web constituting the aforesaid offset portion 45 offset laterally outwardly of the plane of the web 31 and extending from the outer edge 57 of the said second flange 53 in the direction away from the first flange 41 generally at right angles to the second flange 53. The portion 47 extends laterally from the outer edge 59 of the narrow offset web 45, being integrally joined thereto and having a reentrant lip 61 at its free edge 63 extending generally at right angles thereto in the direction back toward the plane of the flange 53. The face 35 of the web 31 may be referred to as the face or front of the chord member 1. The web portion 45 of the head formation 43 and the lip 49 are coplanar and their outside faces form what may be referred to as the back of the chord member 1.

As described in the aforesaid U.S. Pat. No. 5,457,927, the chord members may be cut to the desired length from stock which may be formed with webs 31 of different width, as dictated by the span of the truss and the loading on the truss. The stock may be cold rolled of 22, 20, 18, 16 or 14 gauge steel strip, for example, with the web 31 being 2¼ inches wide, 4¼ inches wide or 6 inches wide, for example. The first and second flanges 41 and 53 of the chord member stock are generally equal in width (e.g. ¾ inch wide). The narrow offset web 45 is 1¼ inches wide, for example, and the head 47 is 1¾ inches wide, for example. The lips 49 and 61 are each ⅜ inch wide, for example. It will be observed that with the stated dimensions for the chord member stock the head 47 extends one inch beyond the plane of the web 31 in the direction away from the narrow web 45. The web 31 of the chord member stock may be formed with a stiffening rib extending lengthwise thereof, a rib 65 being shown herein. It will be noted that the outside dimensions of the chord members as exemplified above approximate the finished dimensions of standard U.S. "2×4", "2×6" and "2×8" lumber sizes, i.e., 1¾"×3½", 1¾"×5½" and 1¾×7¼. It will be observed that the reference numerals applied to the lower chord 1 are the same as those used in said prior U.S. Pat. No. 5,457,427.

The upper chord 3, 3a of each of the trusses may comprise an elongate chord member formed of sheet metal with the same shape in cross-section as the elongate lower chord member 1, 1a and each of the web members may comprise an elongate sheet metal member of similar cross-section. The web members may be of the same cross-section as shown for the web members of the trusses shown in said prior U.S. Pat. No. 5,457,427. The upper chord 3, 3a and the web members may be formed of sheet metal with other shapes in cross-section. As shown, the lower chord member 1, 1a of each truss is arranged with the head formation 43 down. The upper chord member may be arranged with the head thereof up. The chords and web members may be fastened together by means of self-tapping screws, as in the aforesaid prior U.S. Pat. No. 5,457,427.

The lower chord 1a of the supported truss T2 is made of such length and so arranged as to project somewhat beyond the peak end web member 5a, the projecting end of the lower chord being indicated at 67 (see FIGS. 3 and 4). The lower chord 1a of the supported truss T2 is connected at this end thereof to the lower chord 1 of the supporting truss T1 intermediate the ends of the supporting truss T1 by a connector of this invention shown per se in FIG. 7 designated in its entirety by the reference numeral 69. As diagrammed in FIGS. 1 and 3, the supporting truss T1 is supported at its ends as indicated at S1 and S2 and the supported truss T2 is supported at its end away from truss T1, i.e. at its heel, as indicated at S3. As appears in FIG. 4, the lower chord 1 of the supporting truss T1 is set on the supports S1 and S2 with its head formation 43 down and with the face of its web on that side of the truss T1 to which the truss T2 is connected.

Figure 7:
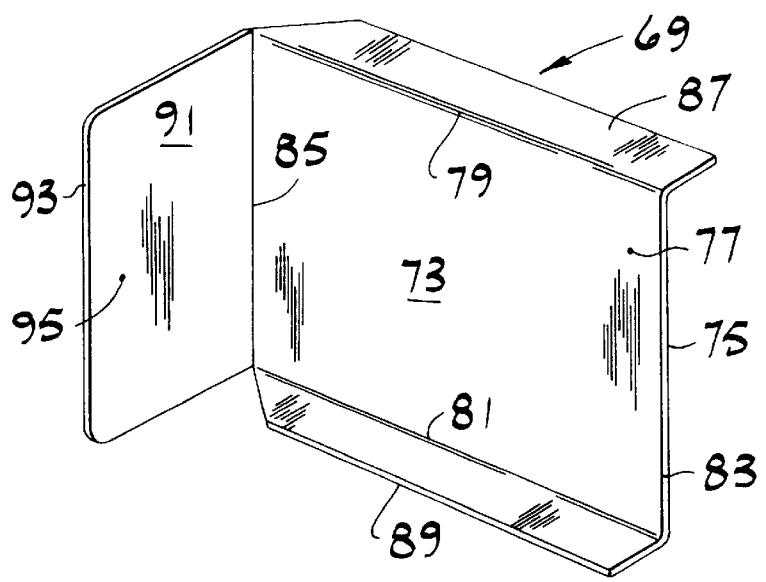
FIG. 7 is a view in perspective of the connector per se shown in FIG. 4, on a larger scale than FIG. 4.
Figure 8:
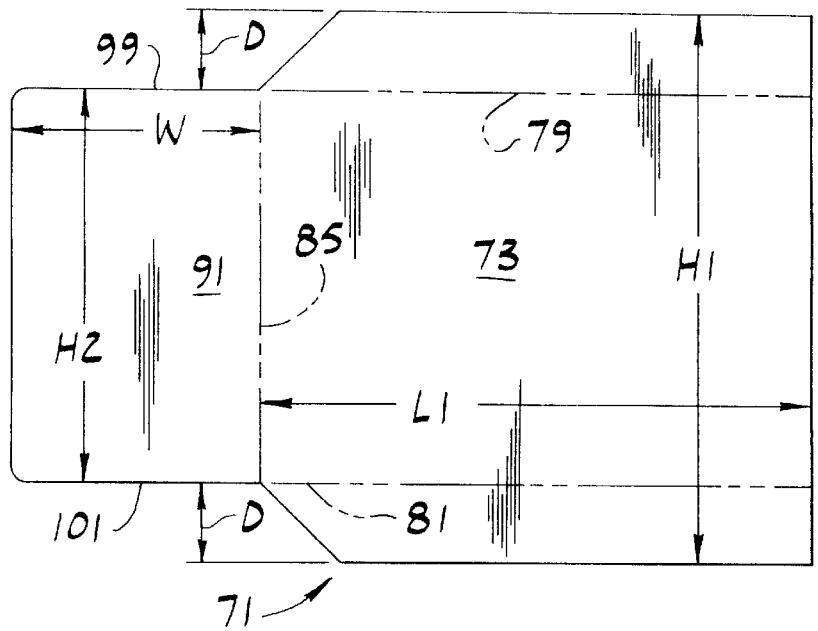
FIG. 8 is a view in elevation of a sheet metal blank from which the FIG. 7 connector is formed.

In accordance with this invention the connector 69 is specially formed from the sheet metal blank 71 shaped as shown in FIG. 8 and bent as shown in FIG. 7 to have a first part 73 in the form of a rectangular plate having first and second opposite faces 75 and 77, said first part constituting a first plate of the connector and having first and second longitudinal edges 79 and 81, a first end edge 83 and a second end edge 85 and a first flange 87 bent to extend laterally outward from said first face 75 at said first longitudinal edge 79 and a second flange 89 bent to extend laterally outward from said second face 77 in the opposite direction to said first flange 87. The connector 69 further has a second part in the form of a plate 91 constituting a second plate of the connector bent from the blank 71 at the second end edge 85 of the first plate at right angles to the first plate, said second plate 91 having first and second faces 93 and 95 in continuation of the first and second faces 75 and 77 of the aforesaid first connector plate 73.

Figure 6:
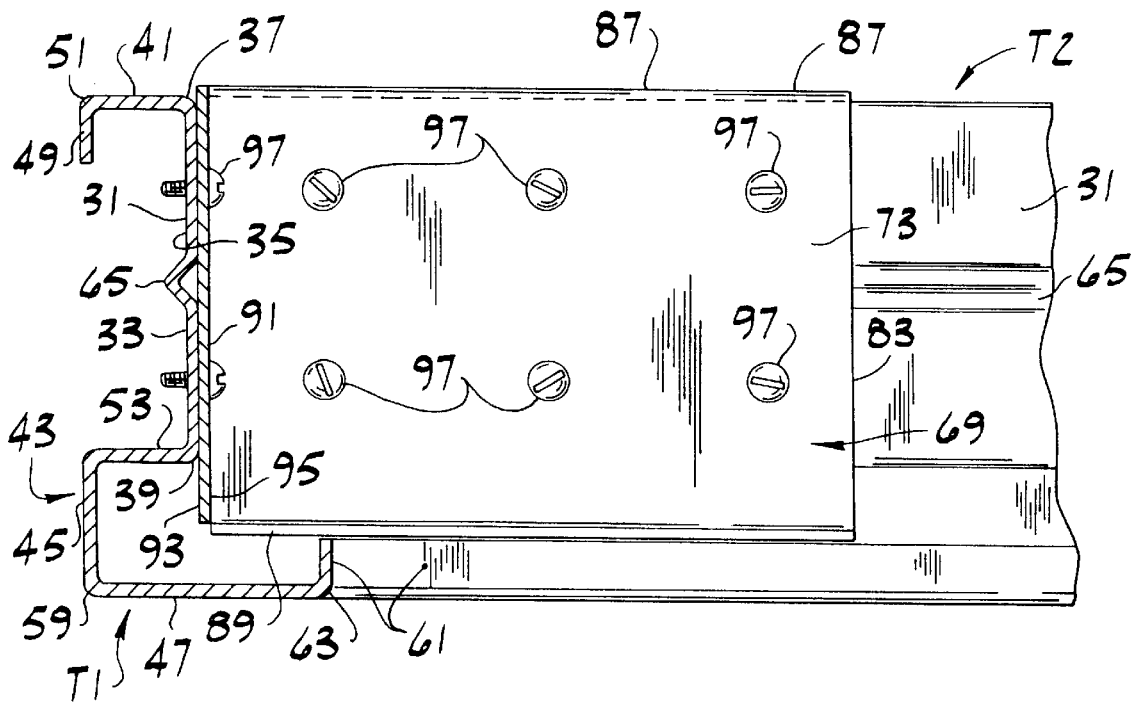
FIG. 6 is a vertical section on line 6—6 of FIG. 4, on the scale of FIG. 5.

As shown in FIGS. 4–6, the stated first connector plate 73 is engaged with the lower chord member 1a of the supported truss T2 at said projecting end 67 of said T2 lower chord member. The stated second connector plate 91 projects laterally outward from said end 67 of the supported truss T2 at right angles thereto and is engaged with the lower chord member 1 of the supporting truss T1 intermediate the ends of said supporting truss. The first connector plate 73 is fastened to the lower chord member 1a of the supported truss T2 and the second connector plate 91 is fastened to the lower chord member of the supporting truss by means indicated at 97, more particularly self-tapping screws. In further detail, the first connector plate 73 has its face 75 engaged flatwise with the said second face 35 of the web 31 of the lower chord member 1a of the supported truss T2, with flange 87 of the first connector plate in overlying engagement with the flange 41 of the lower chord member 1 of the supported truss T2 and the flange 89 of the first connector plate extending outwardly above the level of the lip 61 on the head 47 of the head formation 43 of the lower chord member 1a of the supported truss T2, said first connector plate 73 being fastened to the lower chord member of the supported truss by self-tapping screws such as indicated at 97. The second connector plate 91 has its face 93 engaged flatwise with the face 35 of the web 31 of the lower chord 1 of the supporting truss T1 intermediate the ends of the lower chord member 1 of the supporting truss T1 and is fastened thereto by means of self-tapping screws as indicated at 97. The height of the connector plate 73 from flange 87 to flange 89 is such in relation to the vertical distance from the level of flange 41 of chord member 1 (or 1a) to the level of the upper edge of lip 61 of the chord member that the lower flange 89 of the connector plate 73 extends over the lip 61 of the lower chord 1 of the truss T1 (see FIGS. 5 and 6). The arrangement is such as to provide a strong rigid joint between the lower chord members 1 of the two trusses T1 and T2.

Referring to FIG. 8, the blank 71 for forming the connector 69 is shown in its flat, unbent form as cut from sheet metal plate, e.g., steel plate of a gauge corresponding to that of the sheet metal of the chords 1, of such outline as to have a relatively large rectangular part having a length L1 and an overall height H1 and a smaller rectangular part at one end of the large part having a width W and a height H2 with its upper and lower edges 99 and 101 spaced inward from the upper and lower edges of the large part a distance D. At 79 and 81 are indicated the lines on which the large part is bent to form the flanges 87 and 89, these lines being in line with the upper and lower edges 99 and 101 of the small part, and at 85 is indicated the line on which the blank is bent to bend part 91 away from part 73.

Figure 9:
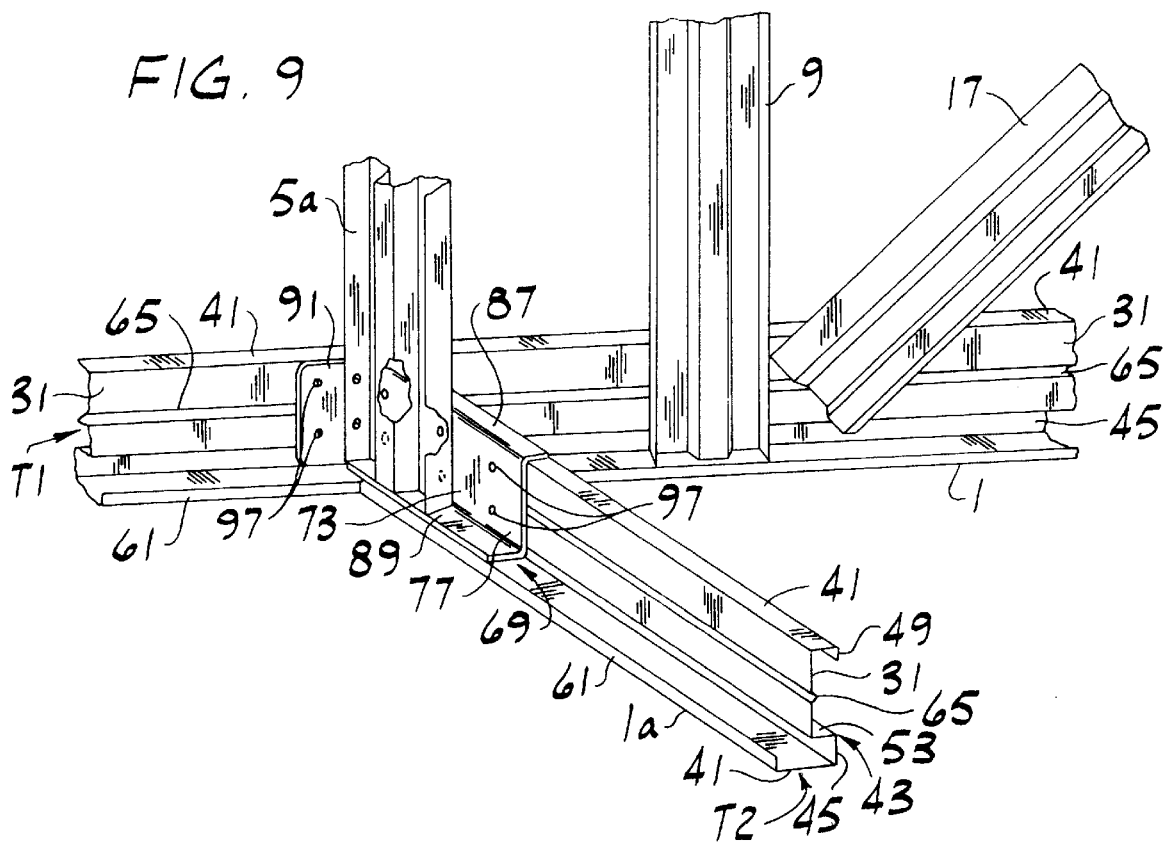
FIG. 9 is a view similar to FIG. 4 showing a different mode of assembly.

As shown in FIG. 4, the end 67 of the lower chord member 1a at the peak end of the supported truss T2 extends outward substantially beyond the peak end web member 5a, and the connector 69 has the connector plate 73 attached to the lower chord member 1a of the supported truss T2 outward of the peak end web member 5a (i.e. between web member 5a and the adjacent end of chord member 1a of the supported truss). FIG. 9 shows a modification in which the lower chord member 1a of the supported truss T2 extends only a short distance beyond the peak end web member 5a and in which the peak end web member 5a is attached to the connector plate 73 on the face 77 of said plate 73 as by means of self-tapping screws after said plate has been pre-assembled with the lower chord member 1a of truss T2.

Figure 10:
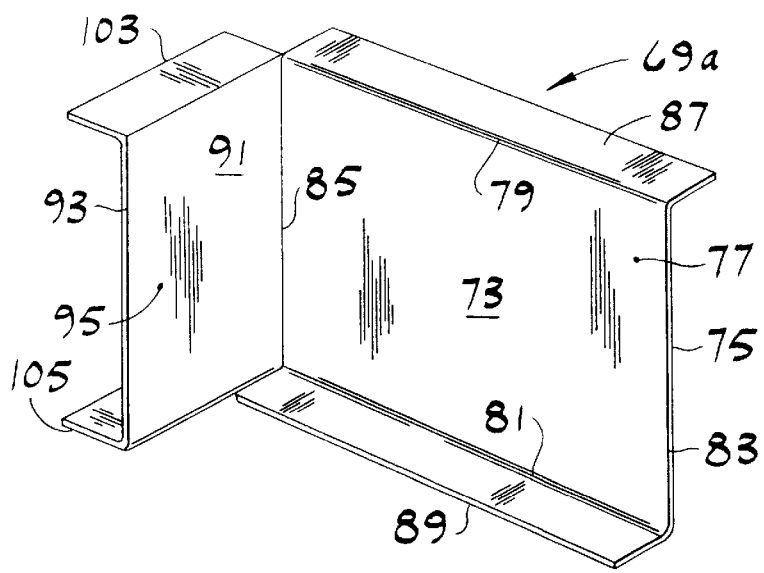
FIG. 10 is a view similar to FIG. 7 showing a different version of the connector.
Figure 11:
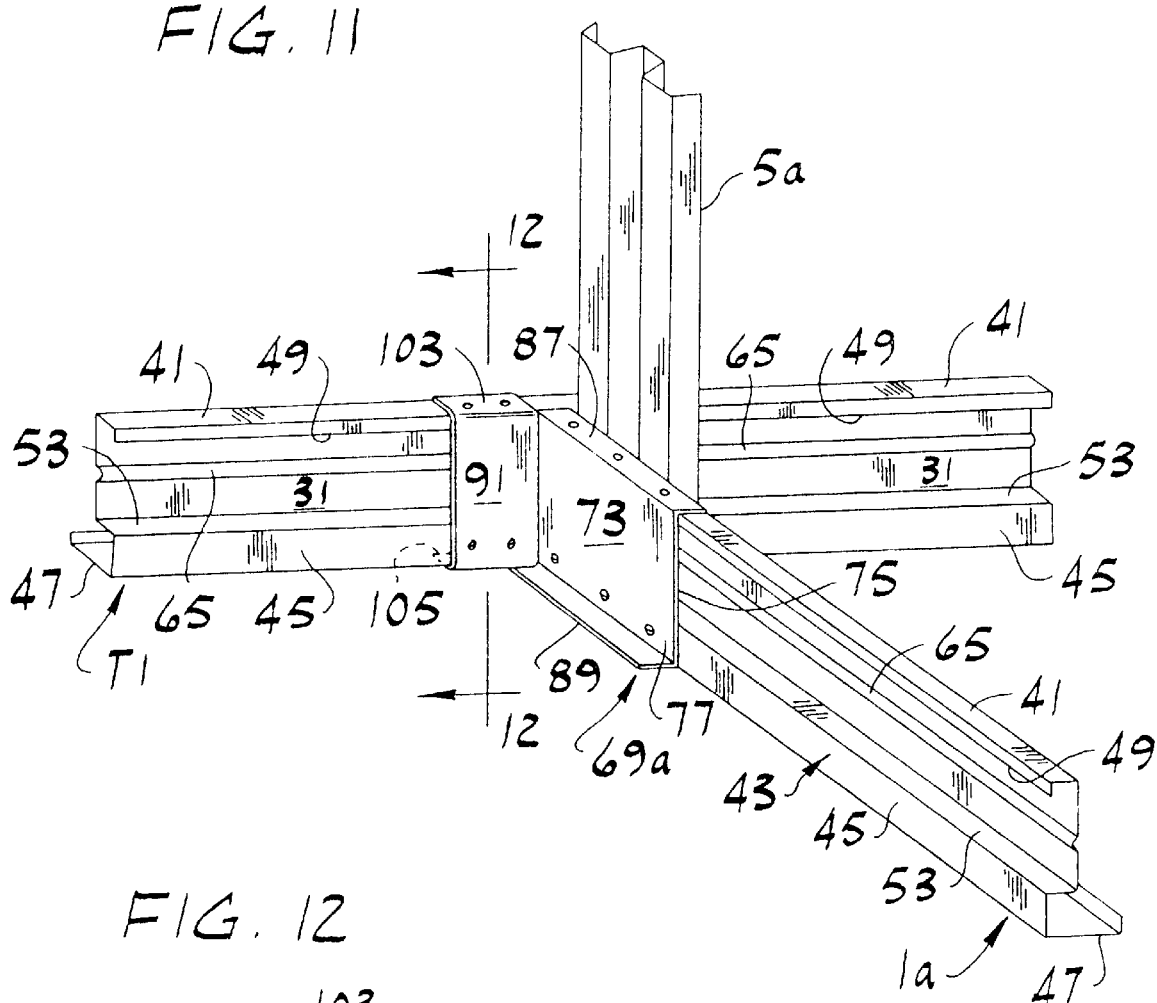
FIG. 11 is a view in perspective similar to FIG. 4 showing an assembly including the connector shown in FIG. 10.
Figure 12:
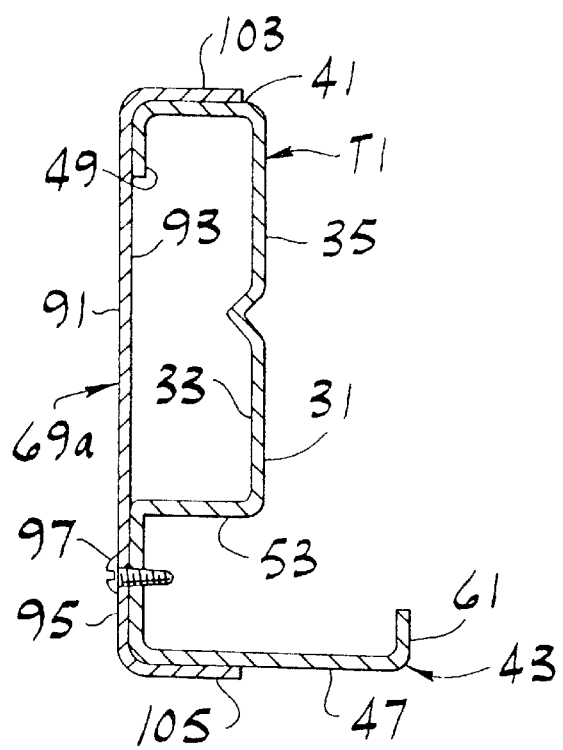
FIG. 12 is a vertical section on line 12—12 of FIG. 11.

FIG. 10 shows a connector 69A which is modified in respect to the connector 69 in that the connector plate 91 has upper and lower flanges 103 and 105 extending outwardly from face 93 thereof (in the direction away from the connector plate 73), these flanges being generally coplanar with the upper and lower flanges 87 and 89 of the connector plate 73. In this modification, the upper and lower flanges of each of the connector plates 73 and 91 are spaced a distance corresponding to the overall height of the lower chord member 1a of each of the trusses T1 and T2. As shown in FIG. 11 the plate 73 of the connector 69A is applied to the lower chord member 1a of the supported truss T2 with its face 75 (its first face) engaging the outside faces of the web portion 45 of the head formation 43 and the lip 49 of the lower chord member 1a of the supported truss T2 (thus being engaged with the back of this chord member instead of its front as in FIG. 4), and with flange 87 (the upper flange) of the connector plate 73 in overlying engagement with the flange 41 of the lower chord member 1a of the supported truss T2 and with flange 89 (the lower flange) of the connector plate 73 extending out in the opposite direction to flange 87 slightly below the level of the head 47 of the head formation 43 of the lower chord member 1a of the supported truss T2. As shown in FIGS. 11 and 12, the second connector plate 91 of the connector 69a has its face 93 engaged flatwise with the outside faces of the web portion 45 of the head formation 43 and the lip 49 of the lower chord 1 of the supporting truss T1 (thus being engaged with the back of this chord member instead of its front as in FIG. 4) and with flange 103 overlying flange 41 and flange 105 underlying head 47 of the chord member 1 of the supporting truss T1. The connector 69a is fastened to the chord members by self-tapping screws 97, including screws driven through the flanges 103 and 105 into flange 41 and head 47.

Figure 13:
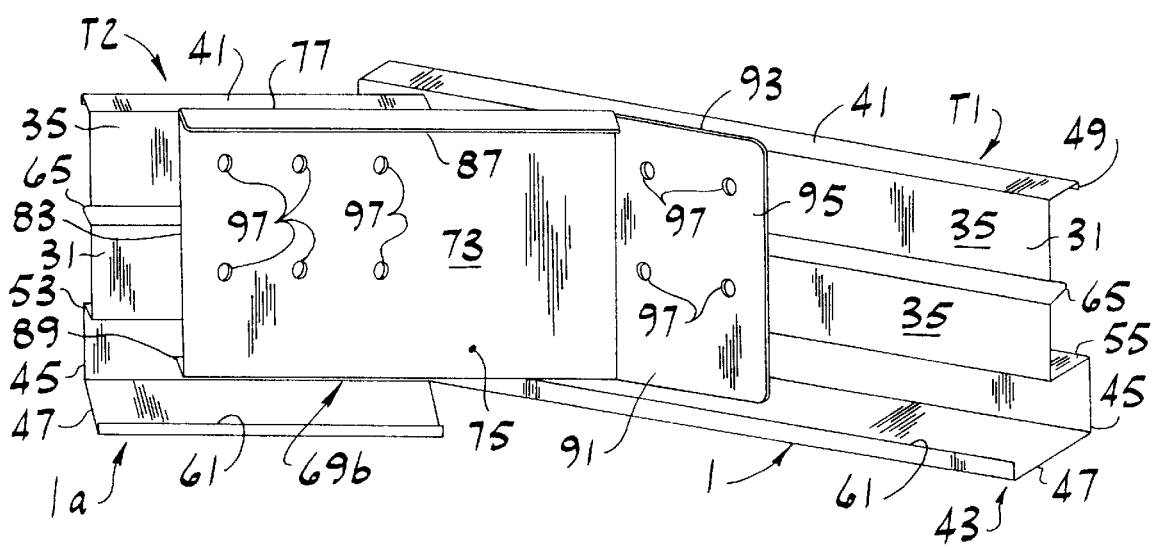
FIG. 13 is a perspective illustrating a modified type of assembly wherein the supported truss extends obliquely (diagonally) with respect to the supporting truss, and showing a modified version of the connector for this type of assembly.

FIG. 13 is a perspective of the truss-to-truss assembly of this invention and a further modification of the connector of this invention wherein the supported truss T2 extends obliquely or diagonally with respect to the supporting truss T1 instead of being at right angles thereto. The connector shown in FIG. 13, designated 69b to distinguish it from the above-described connectors 69 and 69a, is similar to the connector 69 except that the second connector plate 91, instead of being bent to extend at right angles to the first connector plate 73, is bent to extend obliquely (diagonally) at an angle such as shown in FIG. 13 with respect to the face 75 of the plate 73. Further, as shown in FIG. 13, the plate 73 of the connector 69b is applied to the lower chord member 1a of the supported truss T2 with its face 77 in face-to-face engagement with the face 35 of the web 31 of the lower chord member of the supported truss T2, with the flange 87 of plate 73 extending in the direction away from the face 35 of the web 31 and the flange 89 of the plate 73 extending into the space between flange 53 and head 47 of the lower chord member 1a of the supported truss T2. The plate 91 of the connector 69b is applied to the lower chord member 1 of the supporting truss T1 with its face 93 in face-to-face engagement with the face 35 of the web 31 of the lower chord member 1 of the supporting truss T1, the plates 73 and 91 of connector 69b being fastened to the webs 31 by means of selftapping screws as indicated at 97. It will be understood that connector 69b is so dimensioned relative to the lower chord members 1, 1a as to enable the FIG. 13 mode of assembly, and further understood that plate 91 may be bent to extend obliquely (diagonally) at an angle other than that shown, for example at an angle of 45° with respect to the plane of 77 of plate 73 (135° with respect to the plane of face 75).

Arrangements similar to that of FIG. 13 wherein the supported truss extends diagonally with respect to the supporting truss and wherein the connector plate has upper and lower flanges similar to those shown for connector 69a are contemplated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A truss-to-truss assembly comprising a supporting truss and a supported truss each comprising a lower chord, an upper chord and web members extending between the chords, one of the chords of each truss comprising an elongate member formed of sheet metal, means connecting the sheet metal chord member of the supported truss at one end thereof to the sheet metal chord member of the supporting truss with the two trusses in two different generally vertical planes at an angle one to the other, each of said sheet metal chord members having a side face with said side faces thereof generally at said angle, said means comprising a connector formed from a sheet metal blank shaped and bent to have a first part generally in the form of a rectangular plate having first and second opposite faces, said plate constituting a first plate of said connector and having first and second longitudinal edges, a first end edge and a second end edge, said first connector plate having a first and a second flange bent to extend laterally outward therefrom at said first and second longitudinal edges thereof, respectively, the first end edge of said first plate connector being a free edge, and said connector further having a second part in the form of a plate and constituting a second connector plate bent from the blank at said second end edge of said first connector plate and extending at said angle with respect to said first connector plate, said second connector plate having first and second faces in continuation of the said first and second faces of said first connector plate, respectively, said connector having one of said connector plates engaged with said side face of said sheet metal chord member of the supported truss at said one end thereof, and the other of said connector plates projecting out from said one end of the supported truss and engaged with said side face of said sheet metal chord member of the supporting truss, and means fastening the connector plates to said sheet metal chord members.

2. A truss-to-truss assembly as set forth in claim 1 wherein said fastening means comprises self-tapping screws.

3. A truss-to-truss assembly as set forth in claim 1 wherein said sheet metal chord member of the supported truss is connected at one end thereof to the supporting truss intermediate the ends of said sheet metal chord member of the supporting truss, and wherein said side faces of said sheet metal chord members and said first and second connector plates are generally at right angles to one another, the trusses being thereby assembled at right angles to one another.

4. A truss-to-truss assembly as set forth in claim 1 wherein said sheet metal chord member of the supported truss is connected at one end thereof to the supporting truss intermediate the ends of said sheet metal chord member of the supporting truss, and wherein said side faces of said sheet metal chord members extend obliquely with respect to one another and the first connector plate extends obliquely with respect to the second connector plate, the supported truss thereby extending obliquely with respect to the supporting truss.

5. A truss-to-truss assembly comprising a supporting truss and a supported truss each having an elongate member formed of sheet metal, means connecting the sheet metal member of the supported truss at one end thereof to the sheet metal member of the supporting truss, said means comprising a connector formed from a sheet metal blank shaped and bent to have a first part generally in the form of a rectangular plate having first and second opposite faces, said plate constituting a first plate of said connector and having first and second longitudinal edges, a first end edge and a second end edge, said first connector plate having a first and a second flange bent to extend laterally outward therefrom at said first and second longitudinal edges thereof, respectively, the first end edge of said first plate connector being a free edge, and said connector further having a second part in the form of a plate and constituting a second connector plate bent from the blank at said second end edge of said first connector plate and extending at an angle with respect to said first connector plate, said second connector plate having first and second faces in continuation of the said first and second faces of said first connector plate, respectively, said connector having one of said connector plates engaged with said sheet metal member of the supported truss at said one end thereof, and the other of said connector plates projecting out from said one end of the supported truss and engaged with said sheet metal member of the supporting truss, and means fastening the connector plates to said sheet metal members, wherein said first flange extends laterally outward from said first face thereof and said second flange extends laterally outward from said second face thereof in the opposite direction to said first flange, and wherein said first flange overlies the sheet metal member to which said one of the connector plates is attached.

6. A truss-to-truss assembly as set forth in claim 5 wherein said second connector plate has first and second edges generally coplanar with the first and second longitudinal edges of said first connector plate and first and second flanges bent to extend laterally outward from said second connector plate at said first and second edges of said second connector plate, said first and second flanges of said second connector plate both extending outward from said second connector plate in the direction away from the first connector plate, said first and second flanges of said second connector plate being generally coplanar with said first and second flanges, respectively, of said first connector plate and straddling the sheet metal member with which said second connector plate is engaged.

7. A truss-to-truss assembly as set forth in claim 5 wherein the sheet metal member of each truss is an elongate chord member formed of sheet metal with such a shape in cross-section as to have a web having first and second opposite faces in a generally vertical plane and first and second longitudinal edges, a first flange extending laterally outwardly from the first face of the web at the first longitudinal edge of the web, a formation integrally joined to the web at the second longitudinal edge of the web having a portion offset laterally outwardly from the first face of the web and a generally flat portion extending back over said second edge constituting a head for said elongate chord member, said head extending generally at right angles to the plane of the web, having portions on both sides of the plane of the web, wherein said chord member of the supported truss is connected at one end thereof to the supporting truss intermediate the ends of said chord member of the supporting truss, and wherein said connector plates are fastened to the webs of said chord members of the trusses.

8. A truss-to-truss assembly as set forth in claim 7 wherein the elongate chord member of each truss is a lower chord of the truss, each having the head thereof down and the said first flange thereof up, wherein said first face of said web constitutes the front of the chord member, wherein the said first flange has an outer edge and a generally flat reentrant lip at said outer edge extending down toward said formation, said formation comprising a second flange extending laterally outwardly from said first face of the web in the same direction as said first flange having an outer edge, a generally flat relatively narrow flat web extending down from the outer edge of the second flange constituting said portion of the formation which is offset laterally outwardly from said first face of the first mentioned web, said lip and said narrow web having generally coplanar outer faces constituting the back of the chord member, wherein said chord member of the supported truss is connected at one end thereof to the supporting truss intermediate the ends of said chord member of the supporting truss, and wherein the said connector plates are fastened to the fronts of the chord members.

9. A truss-to-truss assembly as set forth in claim 8 wherein the first connector plate is fastened to the front of the supported truss with said first flange of said first connector plate overlying said first flange of the supported truss.

10. A truss-to-truss assembly as set forth in claim 7 wherein the elongate chord member of each truss is a lower chord of the truss, each having the head thereof down and the said first flange thereof up, wherein said first face of said web constitutes the front of the chord member, wherein the said first flange has an outer edge and a generally flat reentrant lip at said outer edge extending down toward said formation, said formation comprising a second flange extending laterally outwardly from said first face of the web in the same direction as said first flange having an outer edge, a generally flat relatively narrow flat web extending down from the outer edge of the second flange constituting said portion of the formation which is offset laterally outwardly from said first face of the first mentioned web, said lip and said narrow web having generally coplanar outer faces constituting the back of the chord member, wherein said chord member of the supported truss is connected at one end thereof to the supporting truss intermediate the ends of said chord member of the supporting truss, and wherein the connector plates are fastened to the backs of the chord members.

11. A truss-to-truss assembly as set forth in claim 10 wherein the second connector plate has flanges engaging the first flange and the head of one of the chord members.

12. A truss-to-truss assembly as set forth in claim 10 wherein said first connector plate is fastened to the back of the supported truss with said first flange of said first connector plate overlying said first flange of the supported truss.

13. A connector for connecting a sheet metal member of a supported truss to a sheet metal member of a supporting truss, said connector being formed of sheet metal and comprising a first generally rectangular plate having first and second longitudinal edges, a first end edge and a second end edge, said first plate having a first and a second flange bent to extend laterally outward therefrom at said first and second longitudinal edges thereof, respectively, and a second plate integral with said first plate bent to extend at an angle with respect to the first plate at said second end edge of the first plate, wherein said first and second flanges are bent to extend in opposite directions from said first plate, and wherein said second plate has first and second edges generally coplanar with the first and second longitudinal edges of the first plate and first and second flanges both bent to extend laterally outwardly from said first and second edges of the second plate in the direction away from said first plate and generally coplanar with the first and second flanges of the first plate.

14. A connector as set forth in claim 13 wherein said second plate is bent to extend at right angles to said first plate.

15. A connector as set forth in claim 13 wherein said second plate is bent to extend obliquely with respect to said first plate.

* * * * *